3,202,625
COMPOSITION FOR WATER BASE PAINTS
Roy W. Tess, Orinda, and Paul R. Van Ess, Berkeley, Calif., assignors to Shell Oil Company, New York, N.Y., a corporation of Delaware
No Drawing. Filed June 2, 1961, Ser. No. 118,782
9 Claims. (Cl. 260—29.6)

The present invention relates to synthetic latex compositions which are interpolymers of three different polymerizable vinyl monomers. More particularly, the invention relates to the preparation of a latex composition which is an interpolymer of vinyl pivalate, an alkyl acrylate and an alpha-unsaturated carboxylic acid.

Copolymers made from monoethylenic monomers containing a vinyl group in aqueous emulsion are known to be useful as surface coatings, paper coatings, and for other uses. Such latices are particularly valuable for surface coatings or paints. Paints made with alkyl acrylates have known advantages such as compatibility with pigments, scrub resistance, good exterior weather resistance, good color stability, and the like, and such films therefore possess certain superiorities over other paint latices such as rubber latex compositions.

In general, acrylate latex polymer is derived from a monomer which by itself would form a soft polymer such as an alkyl acrylate and from a monomer which by itself would yield a hard polymer, such as methyl methacrylate or styrene. While these latices have proven to be quite useful for paints, considerable effort is still being expanded to improve the properties of these paint latices. The present invention relates to such improvement in which superior chemical stability is obtained.

In accordance with the present invention, a process has been developed in which vinyl pivalate is utilized as the hard polymer component to provide an interpolymer utilizing this monomer component in a stable latex which is capable of drying to form a continuous film at room temperature.

Although this application relates primarily to vinyl pivalate, it is believed that the vinyl pivalate may have one or more of its hydrogen atoms substituted with methyl, ethyl or higher alkyl groups and still give substantially equivalent good results.

In order to provide the desired copolymerization in emulsion, it is advisable to include as a comonomer an alpha-beta-vinylidene carboxylic acid. Examples of suitable alpha-beta-vinylidene carboxylic acids include acrylic acid, methacrylic acid, and itaconic acid. The amount of acid used will depend to some extent on the monomer system employed and on the equivalent weight of the acid. Thus, in general, the amount of acid will be from about 0.5 to 5% by weight based on the total monomer and, for methacrylic or acrylic acid, the amount will range from about 1–3% by weight of the total monomer.

The reaction may be carried out in an aqueous emulsion which contains a suitable emulsifier or emulsifier system. Generally, the emulsifier functions as an emulsifying agent for both the monomer and polymer and solubilizing agent for the monomer. Thus, the emulsifiers are influential in the formation of polymers in the stability of the resulting polymer latex. Generally, the emulsifier should form micelles and be present in a sufficient concentration to form these micelles. The polymerization is believed to be initiated by the water soluble initiators at the micelle surface.

Preferably the emulsifier will include an oil soluble anionic emulsifier. A preferred emulsifier is the sodium salt of alkylarylpolyethoxyethanol sulfate. Such a material is available commercially by the tradename "Triton 770." Other anionic emulsifiers which may be used include sodium or potassium oleates, sulfosuccinates, ammonium oleates, and other conventional soaps, organic sulfates and organic sulfonates. Both water soluble and oil soluble anionic emulsifiers may be present in combination. The amount of anionic emulsifier utilized will vary depending upon the monomers, catalyst, and specific emulsifiers used. However, it will generally be within the range of, say, 0.1–5% by weight based on total monomer.

It is also advantageous to use a nonionic emulsifier because this has a stabilizing effect on the polymer latex ultimately formed. In some instances, this nonionic emulsifier may be added after the polymerization is completed, but more frequently it will be added during the course of the polymerization. The nonionic emulsifiers are composed of a hydrophobic or hydrocarbon portion and a hydrophilic portion which is a polyether chain usually terminated with an alcoholic hydroxyl group. Generally, the hydrophilic portion will contain repeating units of, say, 20–50 ether groups and the hydrophobic portion will contain alkyl groups of, say, about 7–12 carbon atoms. Particularly suitable is an octylphenol-ethylene oxide condensation product, and other suitable products include those made by condensing ethylene oxide with alcohols such as nonyl, dodecyl, tetradecyl or alkylphenyls having alkyl groups of 6–15 carbon atoms. Other emulsifiers are made by condensing ethylene oxide with fatty acids whereby monoesters of polyethylene glycols are formed or by condensing unsubstituted amides with ethylene oxide whereby ether-alcohol amides are formed. The amount of nonionic emulsifier varies with the system but it will generally be within the range of, say, from 0.5 to 10% by weight based on total monomer.

As indicated above, the monomer mixture includes an acrylic ester and vinyl pivalate together with the carboxylic acid mentioned above. The proportions of acrylic ester and vinyl pivalate are determined by the particular acrylic ester used and the degree of hardness or softness desired. For example, when methyl acrylate is utilized, the amount of acrylate used will be higher than is the case with ethyl acrylate or normal propyl acrylate since methyl acrylate tends to form a harder film by itself. In other words, when methyl acrylate is utilized, it generally is desirable to have about 90% or more of the methyl acrylate and about 10% or less of vinyl pivalate whereas with higher acrylates, such as normal butyl acrylate, the amount of acrylate will be preferably close to, say, 50 or 55% and the amount of vinyl pivalate will be preferably about 40% or above. The preferred combination is that of ethyl acrylate and vinyl pivalate together with methacrylic acid and the preferred proportions would be from 60–82 parts of ethyl acrylate, from 17–39 parts vinyl pivalate and from 1–3 parts of methacrylic acid per 100 parts total monomer. However, it is to be understood that proportions beyond these preferred ranges are within the ambit of this invention.

In general, any alkyl acrylate having from 4–12 carbon atoms may be used such as methyl acrylate, ethyl acrylate, propyl acrylate, isopropyl acrylate, any butyl acrylate, and 2-ethylhexyl acrylate. However, the preferred acrylates or those in which the alkyl group has from 2 to 4 carbon atoms such as ethyl, propyl, and butyl.

The polymerization must be carried out in an emulsion in such a way that the monomers or polymers do not coagulate and which provides a sufficiently stable product emulsion polymer to dry as explained hereinafter. In general, any free radical catalyst capable of promoting polymerization at a temperature below about 90° C. may be used. A preferred catalyst system is a redox system which allows excellent control of the polymerization and enables the reaction to proceed smoothly at optimum reaction temperatures.

In the so-called redox system, the catalyst will be an oxidizing catalyst such as water soluble or partially water soluble hydroperoxide or persulfate. The catalyst then decomposes under the influence of a reducing agent such as ferrous iron, or sodium hydrosulfite. The reaction is thus controlled by keeping the temperature below the temperature where the peroxide or persulfate decomposes thermally and the desired decomposition effected by the addition of controlled amounts of reducing agent.

In a preferred form, a process is carried out by mixing the monomers together in the desired proportion, mixing water and emulsifiers together and adding to the monomer mixture to provide an emulsion consisting of the monomer mixture and the emulsifying agent. In the preferred process a peroxide catalyst is also added to the mixture. A portion of the mixture is then treated with sufficient reducing agent or activator to begin the reaction and allow the desired reaction temperature to be achieved. The further control is then effected by controlled external cooling and by the addition of further emulsion and a proportionate addition of reducing agent to continue the reaction at the desired temperature. After the polymerization is completed, the emulsion is stripped of unreacted monomer and neutralized and then made alkaline with ammonium hydroxide. The final pH is usually between 8 and 11. Additional stabilizers and/or protective colloids or other additives may be added to protect the stable emulsion latex.

Residual monomer may be removed by steam stripping or any other known procedure for removing unreacted monomer. The latex is now ready for use in textile treating or for pigmentation to make pigmented paints or any other known use for this class of latex.

In order to better illustrate the invention, the following examples are given:

Example I

The apparatus consists of a conventional three liter reaction flask, with one central and four peripheral ground glass openings, fitted with a reflux condenser, stirrer, thermometer, nitrogen gas inlet tube, a two-liter separatory funnel with 100 ml. graduations, and a 250 ml. graduated dropping funnel. A monomer mixture is prepared by mixing the following ingredients in the proportions given:

| | G. |
|---|---|
| (66.0%) of ethyl acrylate | 178.5 |
| (32.7%) of vinyl pivalate | 88.5 |
| (1.3%) of methacrylic acid | 3.5 |
| | 270.5 |

This monomeric mixture is then incorporated into an emulsion premix by adding the following material to a two-liter separatory funnel and subjecting the mixture to three cycles of shaking and standing.

270.5 g. monomer
110 ml. distilled water
10.82 g. (3.25 g. of solid) of sodium salt of alkyl aryl polyethoxy ethanol sulfate (30% solids)
.35 g. of ammonium persulfate The reaction flask is swept with nitrogen and ⅓ of the emulsion premix is added together with a similar volume of water. 17 ml. of 1% $Na_2S_2O_4$ is added and the temperature rises spontaneously to about 68° C. where the temperature is maintained with external heating while the remainder of the emulsion premix and additional sodium hydrosulfite is added incrementally. After all of the feed emulsion is added and the reaction is continued to about 25% solids, the amount of sodium hydrosulfite to bring the total amount to 21.6 mm. of 1% solution is added together with 5.4 g. solid or 21.6 g. of 25% solution of solids of octylphenol-ethylene oxide (1:30) condensation product. The heating is continued until polymerization is completed. The total reaction mixture (576 g.) is filtered through two layers of cheesecloth. In a typical run, the coagulum amounts to 4.76 g. or 1.75% by weight of total monomer; the total solids found is 43.5% and the weight average particle diameter is about 1400 A.

The resulting latex is stable and suitable for preparing paints having superior chemical stability. The polymer is also believed to be light resistant.

Example II

The procedure of Example I is repeated except that the 270 g. of monomer premix contained 44.4 g. (16.4%) of vinyl pivalate, 222.6 g. (82.3%) ethyl acrylate, and 3.5 g. (1.3%) methacrylic acid. The average reaction temperature is 71° C. and the pH is adjusted to 9.7 with ammonium hydroxide. In a typical run, the latex contains 44.4% solids and has a coagulum of 0.67. The particle size is about 1000 A.

Example III

The procedure of Example I is repeated except that normal propyl acrylate is used instead of ethyl acrylate. Similarly good stable latex is obtained.

We claim as our invention:

1. A method of making a stable latex comprising copolymerizing a monomer mixture consisting essentially of (1) from about 4 to about 50% by weight of total monomer of vinyl pivalate, (2) from about 49.5 to 95.5% by weight of total monomer of an alkyl acrylate having from 4 to 12 carbon atoms, and (3) from about 0.5 to 5% by weight of total monomer of an alpha-beta-vinylidene carboxylic acid in an aqueous emulsion at a temperature between about 0° C. and 90° C., using a free radical catalyst.

2. The method defined in claim 1, in which the free radical catalyst is a redox catalyst.

3. The method defined in claim 1, in which the temperature of the reaction mixture is maintained between about 60 and about 80° C. during the major portion of the reaction period.

4. A method of making a stable latex comprising copolymerizing a monomeric mixture consisting essentially of (1) from about 4% to about 50% by weight of total monomer of vinyl pivalate, (2) from about 49.5 to 95.5% by weight of total monomer of an alkyl acrylate having from 4 to 12 carbon atoms, and (3) from about 0.5 to 5% by weight of total monomer of an alpha-beta-vinylidene carboxylic acid in an aqueous emulsion containing an anionic emulsifier at a temperature between about 0° C. and 90° C. using a free radical catalyst, stabilizing said emulsion by the addition of a nonionic emulsifier, and adjusting the pH to a value between 8 and 11 with ammonium hydroxide.

5. A method of making a stable latex comprising copolymerizing a monomer mixture consisting essentially of from about 4 to 50% by weight of total monomer of vinyl pivalate, from about 49.5 to 95.5% by weight of total monomer of ethyl acrylate, and from about 0.5 to 5% by weight of total monomer of an alpha-beta-vinylidene carboxylic acid in an aqueous emulsion at a temperature between 0° C. and 90° C. using a free radical catalyst.

6. The method defined in claim 5, in which the free radical catalyst is a redox catalyst system.

7. The method defined in claim 5 in which the reaction temperature is maintained between about 60° C. and 80° C. during the major portion of the reaction period.

8. The method defined in claim 5 in which the alpha-beta-vinylidene carboxylic acid is methacrylic acid.

9. The method defined in claim 5 in which the emulsifier contains an anionic emulsifier and the latex is further stabilized by adding a nonionic emulsifier and adjusting the pH to between about 8 and 11.

References Cited by the Examiner
UNITED STATES PATENTS

| | | | |
|---|---|---|---|
| 2,381,338 | 8/45 | Cornthwaite et al. | 260—86.1 |
| 2,753,318 | 7/56 | Maeder | 260—29.6 |
| 2,795,564 | 6/57 | Conn | 260—29.6 |

MURRAY TILLMAN, *Primary Examiner.*

LEON J. BERCOVITZ, *Examiner.*